United States Patent [19]
Pietro

[11] Patent Number: 5,271,181
[45] Date of Patent: Dec. 21, 1993

[54] APPARATUS FOR EJECTION DOORS FOR RAILWAY AND TRAMWAY VEHICLES

[75] Inventor: Losito Pietro, Zucche-Volvera/Turin, Italy

[73] Assignee: O.C.L.A.P. s.r.l., Piscina, Italy

[21] Appl. No.: 953,714

[22] Filed: Sep. 30, 1992

[51] Int. Cl.⁵ .............................................. E05C 7/06
[52] U.S. Cl. ...................................... 49/118; 49/213; 49/215; 49/220
[58] Field of Search ............... 49/118, 123, 213, 215, 49/220, 219

[56] References Cited

U.S. PATENT DOCUMENTS

| | | | |
|---|---|---|---|
| 2,175,906 | 10/1939 | McCormick | 49/118 |
| 4,091,570 | 5/1978 | Favrel | 49/118 |
| 4,142,326 | 3/1979 | Schmitz | 49/118 |
| 4,150,509 | 4/1979 | Knap | 49/123 |
| 4,152,870 | 5/1979 | Knap | 49/118 |
| 4,259,810 | 4/1981 | West | 49/118 |
| 4,457,108 | 7/1984 | Kuschel et al. | 49/118 X |
| 4,464,863 | 8/1984 | Chikaraishi et al. | 49/213 |
| 4,503,637 | 3/1985 | Parente | 49/118 X |
| 4,924,625 | 5/1990 | Dilcher | 49/220 X |

*Primary Examiner*—Philip C. Kannan
*Attorney, Agent, or Firm*—Bacon & Thomas

[57] ABSTRACT

An apparatus for opening and closing ejecting doors on railway and tramway vehicles includes a motion transmission and ejection control assembly and a wing translation, drive and support assembly. The motion transmission and ejection control assembly functions to guide and forcibly shift the doors between their open and closed positions. Upon disablement of the motion transmission and ejection control assembly or an emergency, the wing translation, drive and support assembly permits the doors to be shifted to a partially open position wherein the doors can be manually opened.

4 Claims, 4 Drawing Sheets

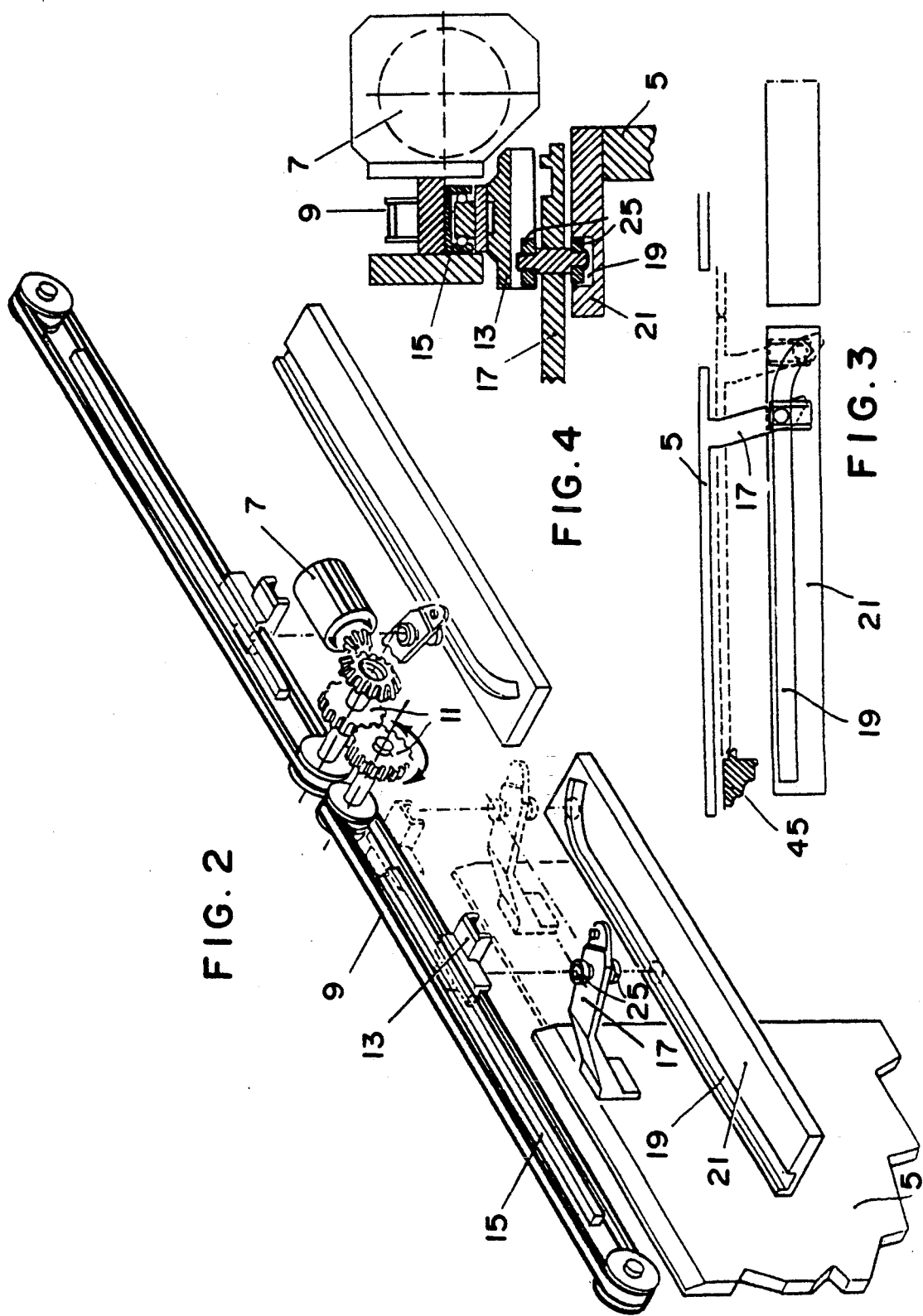

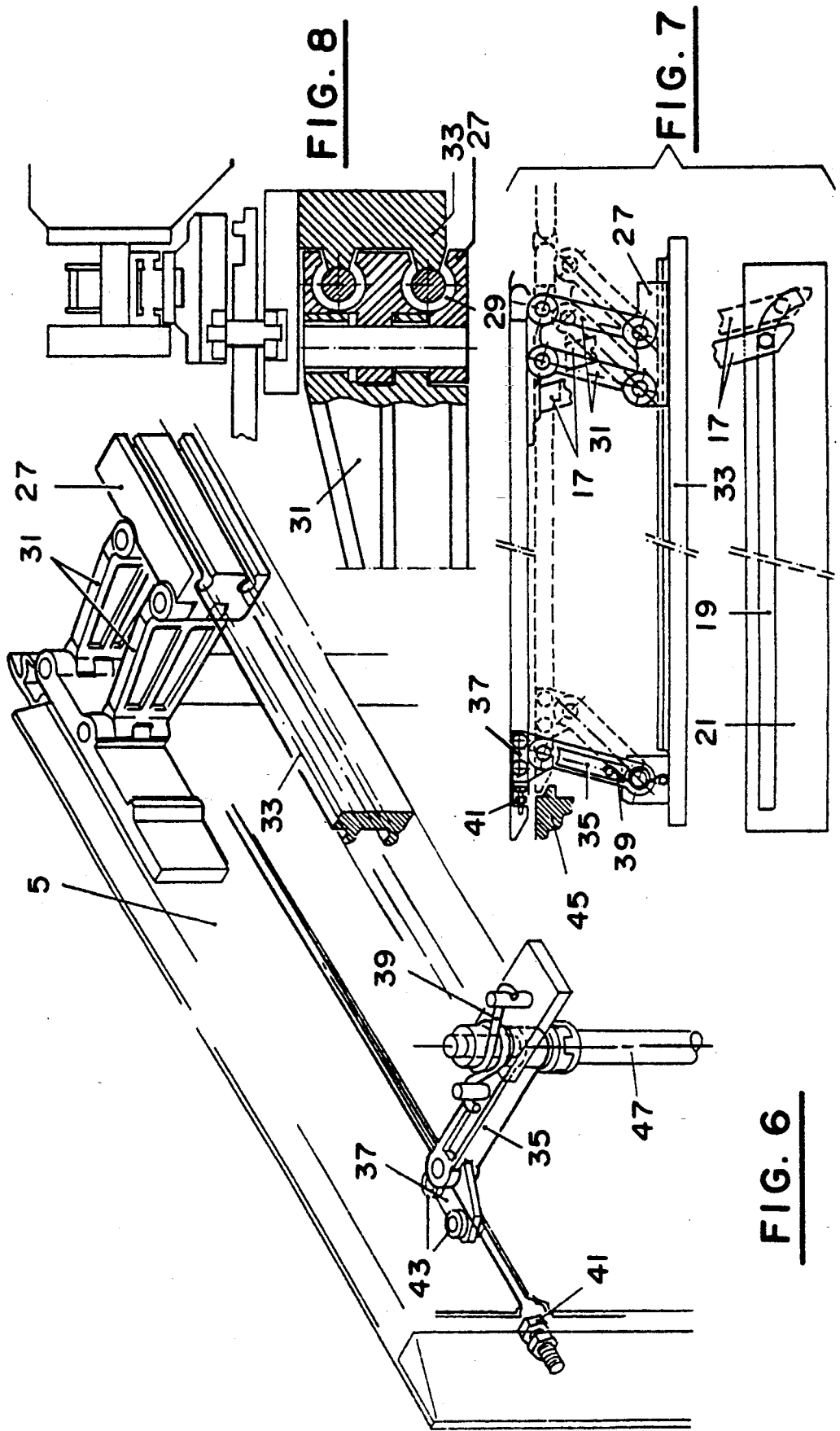

APPARATUS FOR EJECTION DOORS FOR RAILWAY AND TRAMWAY VEHICLES

BACKGROUND OF THE INVENTION

1. Field of the Invention

The present invention refers to an apparatus for ejection doors for opening and closing railway and tramway vehicles.

2. Background Information

Various systems are currently being used on railway and tramway coaches and/or other similar vehicles to open and close their doors.

These known systems are essentially based on rotation devices and, sometimes on ejection devices with a subsequent translation.

In rotary door opening systems, the basic problem was the overall dimensions or that the space required by the door movement to be opened and closed is usually very high.

In ejection system with subsequent translation, the overall dimensions are greatly reduced with respect to the above-mentioned rotation systems, but the complexity of these controls remains.

SUMMARY OF THE INVENTION

An object of the present invention is to provide a door opening and closing system for railway and tramway vehicles of the above-mentioned type with ejection and translation, which is simple and reliable while allowing an easy manoeuvre of the doors themselves, guaranteeing at the same time minimum overall dimensions for their opening and closing manoeuvres.

These and other purposes are obtained by an apparatus for ejection doors for railway and tramway vehicles, substantially composed of:

a motion transmission and ejection control assembly, wings, and a wing translation, drive and support assembly.

The motion transmission and ejection control assembly being composed of: a motor mechanism that transmits motion to two conjugated geared belts, through gears; two wing-dragging slides, integral with the belts and supported by ball guides; sliding tracks; two brackets connecting wings-slides-tracks, engaged, in their upper part, to the wing-dragging slides and, in their lower part, to the sliding tracks. The sliding tracks being rectilinear for a section to enable the longitudinal stroke of the wings, and then inwardly arc-bent to enable the transverse stroke of the wings. The wings are formed of a frame made with light-alloy extruded materials, panelled with two sheets made of materials like aluminum or the like, with their internal volumes filled with a honey-comb structure made of the same material. The wing translation, drive and support assembly being composed of: a wing-supporting guide with linear ball bearings; a pantograph system connecting the wings and wing-supporting guide; a fixed guide connected to the motion transmission and ejection control assembly on which the wing-supporting guide slides; a wing-driving arm connected to a sliding support whose function is to further guide the wings during their translation and realizing, through a torsion spring, a first spreading-apart stroke of the wings, allowing the insertion of hands between the wings to facilitate their opening in case of emergency; and an adjusting screw, for setting the engagement of the wing translation, drive and support assembly in the final closing stage.

Gaskets are provided about the perimeter of the wings and framework edges, guaranteeing their seal when the doors are closed with some cuff gaskets being housed along the vertical edges of the wings. The gaskets are made of self-extinguishing materials, complying with the safety standards related to fires in railway materials.

The invention will now be described in detail with particular reference to the enclosed drawings, provided as non-limiting examples.

BRIEF DESCRIPTION OF THE DRAWINGS

FIG. 2 is a perspective view showing the motion transmission and ejection control assembly with electric control;

FIG. 3 is a schematic top view of the wing, bracket and sliding track assembly;

FIG. 4 is a schematic side view, partially sectioned, of the motion transmission and ejection control assembly in FIG. 2;

FIG. 6 is a perspective view showing the wing translation, drive and support assembly;

FIG. 7 is an exploded schematic view, from the top, showing the wing translation, drive and support assembly and the motion transmission and ejection control assembly; and FIG. 8 is a schematic side view, partially sectioned, of the wing translation, drive and support assembly in FIG. 6, connected to the motion transmission and ejection control assembly in FIG. 4.

DESCRIPTION OF PREFERRED EMBODIMENTS

Figure 1:
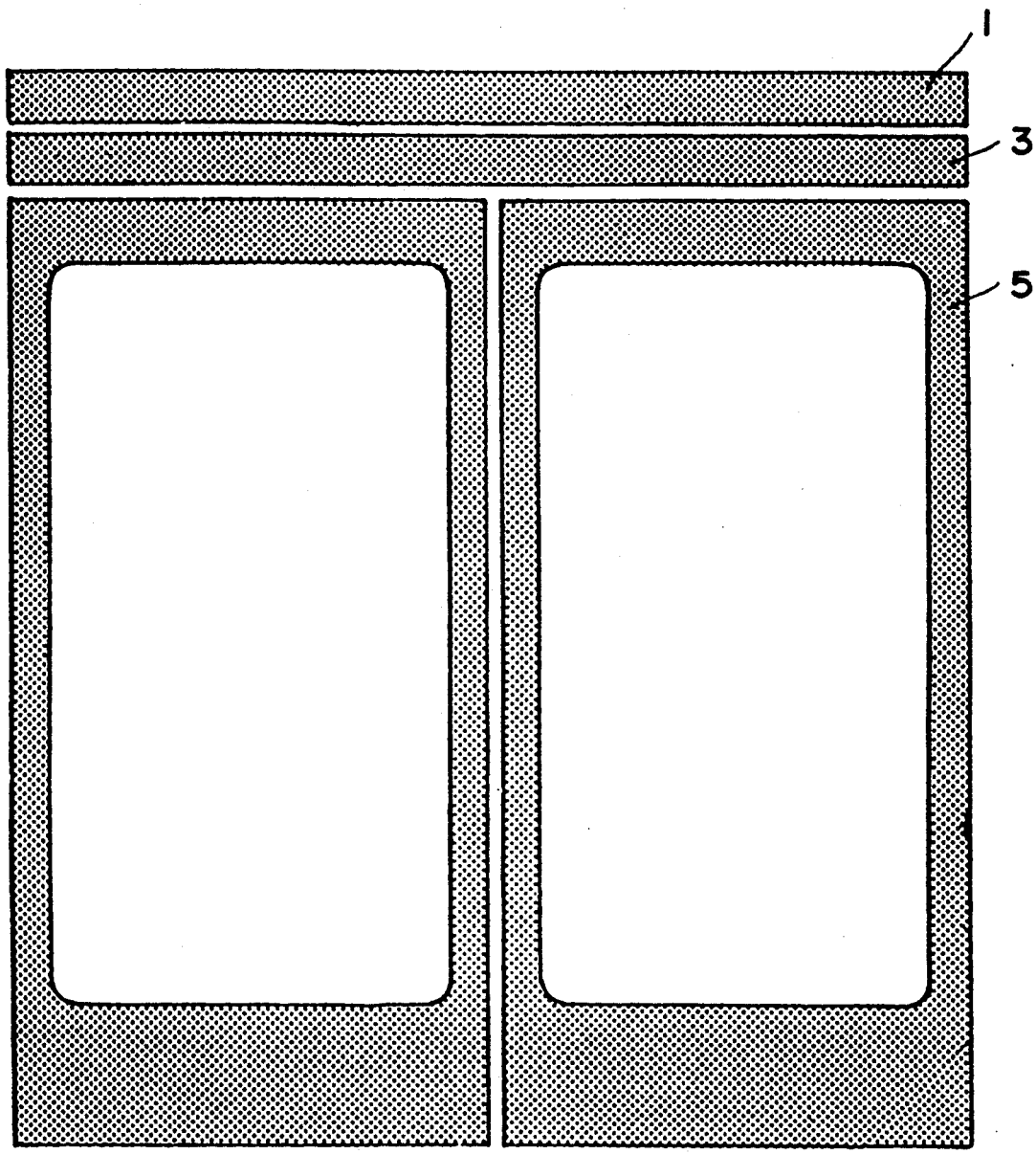
FIG. 1 is a schematic view of the apparatus composition.

Referring to the figures, the apparatus for ejection doors for railway and tramway vehicles being considered is substantially composed of:

a motion transmission and ejection control assembly 1; wings 5; and a wing translation, drive and support assembly 3.

The motion transmission and ejection control assembly 1 is substantially composed of: a motor that transmits motion to two conjugated geared belts 9, through gears 11; two wing-dragging slides 13, integral with the belts 9 and supported by ball guides 15; sliding tracks 19; and two brackets 17 connected in their upper part, to the wing-dragging slides 13 and, in their lower part, to the sliding tracks 19. The sliding tracks 19 are formed in respective shelves 21 and are rectilinear for a section to realize the longitudinal stroke of the wings 5, and then inwardly arc-bent to realize the transverse, ejection or closure stroke of the wings 5.

Figure 5:
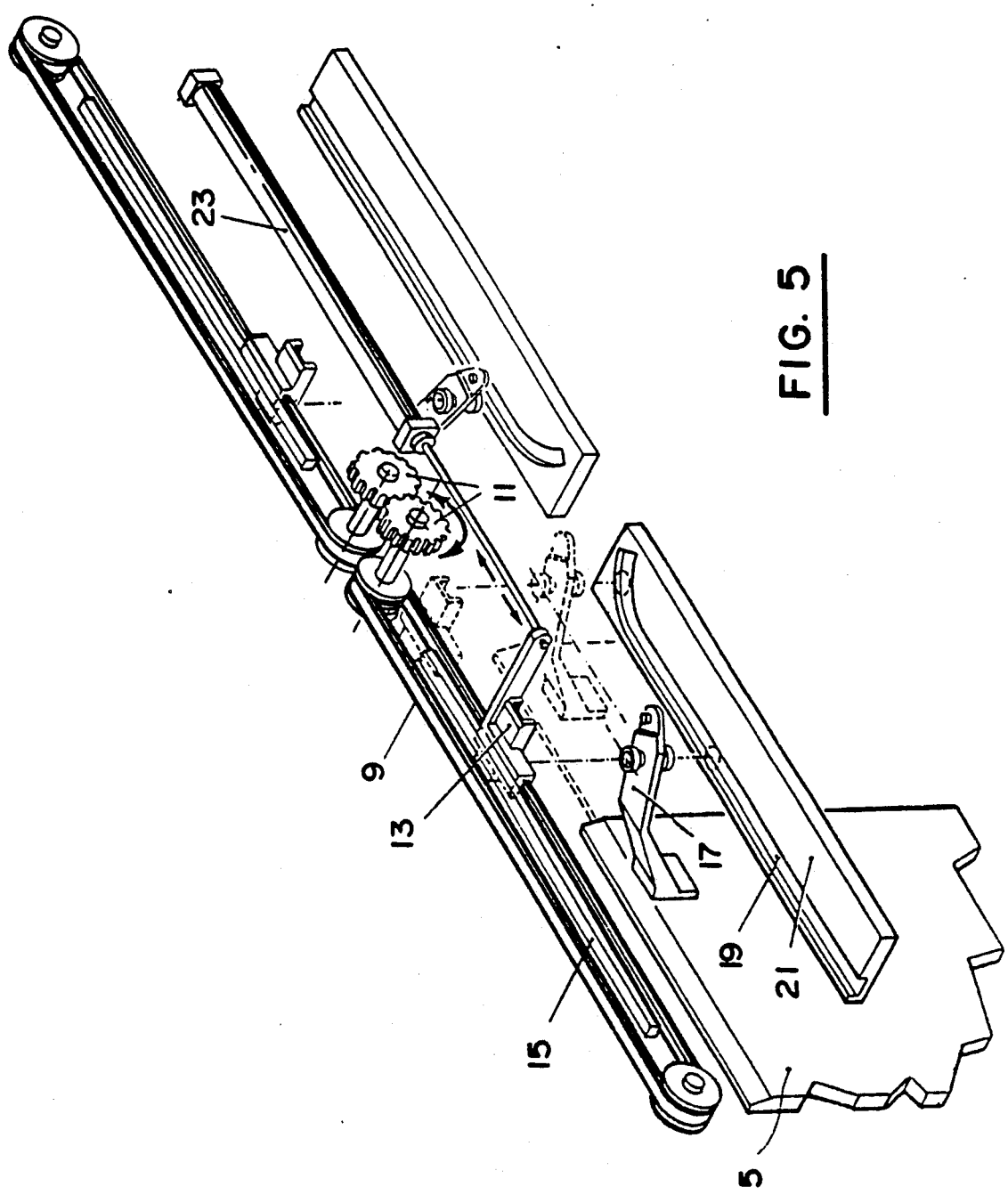
FIG. 5 is a perspective view showing the motion transmission and ejection control assembly with pneumatic control.

In FIG. 2, the motor of assembly 1 is composed of an electric motor 7; in FIG. 5, the motor is composed of a cylinder 23 with fluid pressure, in particular, a pneumatic cylinder.

The brackets 17 are equipped at their free ends with rolling bearings 25 suitable to be engaged to the track 19 in the shelf 21 and in the seat of the wing-dragging slide 13.

The wing translation, drive and support assembly 3 as best shown in FIGS. 6 and 8 is substantially composed of: a wing-supporting guide 27 with linear ball bearings 29; a pantograph system (including at least two arms 31 per wing) connecting wings 5 and wing-supporting guide 27; a fixed guide 33 connected to the motion transmission and ejection control assembly 1, on which the wing-supporting guide 27 slides; a wing-driving arm 35 connected to a sliding support 37 whose function is to further guide the wings 5 during their translation and providing, through a torsion spring 39, a first spreading-apart stroke of the wings 5 which permits the insertion of hands between the wings to facilitate their opening in case of an emergency; and an adjusting screw 41 for setting the engagement of the wing translation, drive and support assembly 3 in the final closing stage.

Reference number 43 shows the rolling bearings provided at the end of the wing-driving arm 35; reference number 45 shows the edge of the fixed framework with respect to which the wings 5 move,, during their ejection or closure.

The torsion spring 39 is wound around a column 47, running vertically and interrupted downwards: hinging of the wings 5 in their lower part is similar to the above-described hinging with wing-driving arm 35, sliding support 37 and torsion spring 39 placed on the lower side and connected to the lower end, not shown, of the column 47.

The wings 5 are formed of a frame made from light-alloy extruded materials, panelled with two sheets made of materials like aluminum or the like, with their internal volumes filled with a honey-comb structure.

Gaskets are housed on the perimeter of the wings and framework edges, guaranteeing their seal when the doors are closed with some cuff gaskets being housed along the vertical edges of the wings. The gaskets are made of self-extinguishing materials, complying with the safety standards related to fires in railway materials.

The operation of the device is as follows: at the end of the closure stroke of the door wing 5, the adjusting screw 41 abuts against the sliding support 37 and makes the arm 35 rotate and load the torsion spring 39. Therefore, when the door is closed, the arm 35 and the pantograph arms 31 are moved to the position shown with a dashed line FIG. 7, and the spring 39 is loaded.

A temporary shortage of current (or other interruptions or faults in the energy supply), through a normal safety device (not shown because well known in the art), releases the motor means of the assembly 1. Then, the loaded spring 39 goes back to its initial position and brings back arm 35 and pantograph arms 31, and therefore the door wings 5, in a partially opened position, corresponding to the rest position of the torsion spring 39. This position is shown in continuous lines in FIG. 7.

After this slight displacement of the wings 5, a hand can be inserted between the wings 5 in order to fully spread them apart and to open the door.

The "spreading apart stroke" is only the stroke determined by the back stroke of the torsion spring 39 from its loaded position to the rest or unloaded position, i.e., stroke by which the wing 5 goes from a closed position to a partially opened position as clearly shown in FIG. 7.

Although the present invention has been described with reference to preferred embodiments, numerous modifications and rearrangements can be made, and still the result will come within the scope of the invention.

I claim:

1. An apparatus for ejection doors for railway and tramway vehicles comprising:
   a) a motion transmission and ejection control assembly,
   b) wings movable between open and closed positions, and
   c) a wing translation, drive and support assembly; wherein:
   a) the motion transmission and ejection control assembly is constituted by:
      a motor means that transmits motion to two conjugated geared belts, through gears;
      two wing-dragging slides each of which is fixedly secured to a respective one of the belts;
      a pair of sliding tracks each including a shelf having an elongated first section extending substantially parallel to said wings and an inwardly arc-bent second section;
      two brackets including first ends each being secured to a respective one of said wings and second ends engaged, in their upper part, to the wing-dragging slides and, in their lower part, to the sliding tracks, said motion transmission and ejection control assembly functioning to guide said wings for movement relative to said sliding tracks by operation of said motor means and the interconnection of said wings to said wing-dragging slides through said brackets;
   b) the wing translation, drive and support assembly is constituted by:
      a wing-supporting guide;
      a support member slidably mounted upon said wing-supporting guide;
      a pantograph system, said arms pivotally interconnecting said wings and said wing-supporting guide;
      a fixed guide, connected to the motion transmission and ejection control assembly, on which the wing-supporting guide slides;
      a wing-driving arm having one end pivotally connected to said support member and another end which is pivotal with respect to said fixed guide, said wing-driving arm being pivoted by engagement of a respective one of said wings with said support member as said wing is shifted to its closed position;
      a torsion spring having one portion fixed with respect to said fixed guide and another portion attached to said wing-driving arm such that said torsion spring can be loaded upon pivoting of said wing-driving arm relative to said fixed guide, said torsion spring when loaded enabling said wings to be spread apart upon failure of said motor means.

2. An apparatus for ejection doors for railway and tramway vehicles according to claim 1, wherein the motor means of the motion transmission and ejection control assembly is constituted by an electric motor.

3. An apparatus for ejection doors for railway and tramway vehicles according to claim 1, wherein the motor means of the motion transmission and ejection control assembly is constituted by a fluid cylinder.

4. An apparatus for ejection doors for railway and tramway vehicles according to claim 1, further including an adjusting screw, carried by at least one of said wings, for adjusting the position in which said wing engages said support member.

* * * * *

UNITED STATES PATENT AND TRADEMARK OFFICE
CERTIFICATE OF CORRECTION

PATENT NO.    : 5,271,181
DATED         : December 21, 1993
INVENTOR(S)   : Pietro Losito It is certified that error appears in the above-identified patent and that said Letters Patent is hereby corrected as shown below:

<u>Title page,</u>
Item [75], please correct the inventor's name to read as follows:
-- Pietro Losito -- not "Losito Pietro"

Signed and Sealed this

Twelfth Day of August, 2003

JAMES E. ROGAN
*Director of the United States Patent and Trademark Office*